Aug. 1, 1967     H. SCHOEPE     3,333,511
MACHINE TOOL WITH GEAR TOOTH ARBOR DRIVE
Filed Oct. 19, 1965     2 Sheets-Sheet 1
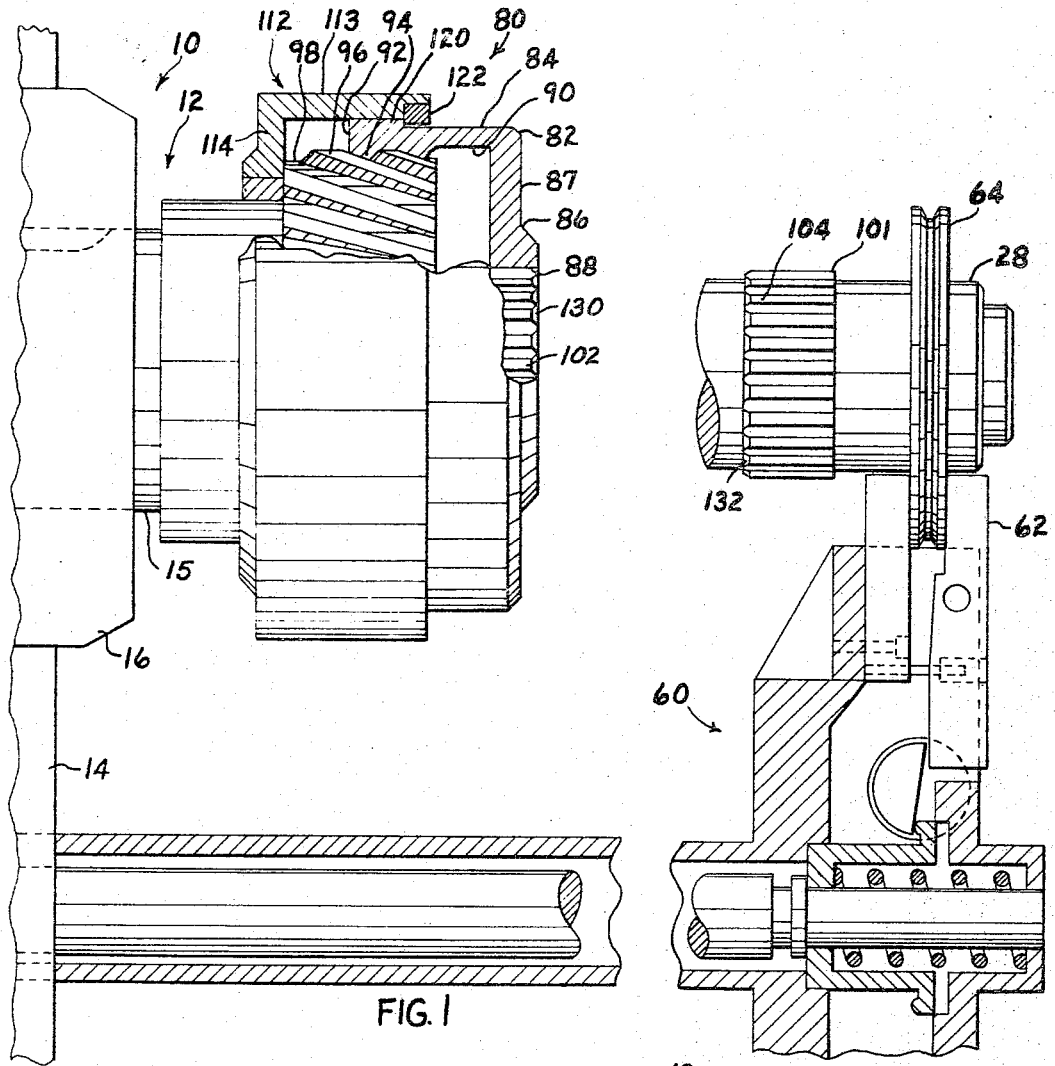
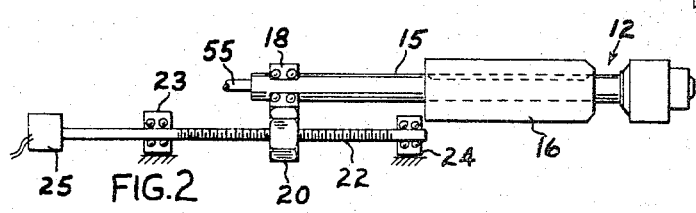
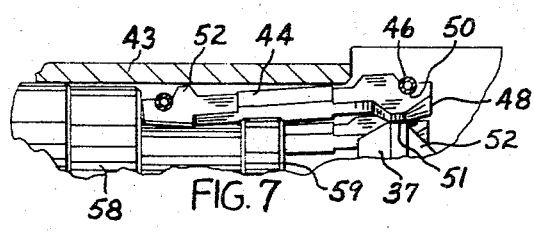
INVENTOR.
HARRY SCHOEPE
BY Hoffmann and Yourst
ATTORNEYS Aug. 1, 1967  H. SCHOEPE  3,333,511

MACHINE TOOL WITH GEAR TOOTH ARBOR DRIVE

Filed Oct. 19, 1965  2 Sheets-Sheet 2

INVENTOR.
HARRY SCHOEPE
BY Hoffmann and Yount
ATTORNEYS

United States Patent Office 3,333,511
Patented Aug. 1, 1967

3,333,511
MACHINE TOOL WITH GEAR TOOTH
ARBOR DRIVE
Harry Schoepe, Broadview Heights, Ohio, assignor to The
Warner & Swasey Company, Cleveland, Ohio, a corporation of Ohio
Filed Oct. 19, 1965, Ser. No. 497,783
16 Claims. (Cl. 90—11)

The present invention relates to machine tools, and more particularly to a drive mechanism for effecting a driving connection between a rotatable spindle and a detachable tool holder of a machine tool.

An important object of the present invention is to provide a new and improved machine tool having a spindle including a drive mechanism for drivingly interconnecting the spindle and a tool holder and which is so constructed and arranged that the drive mechanism automatically effects a positive driving connection between the tool holder and spindle in response to relative co-axial movement of the spindle and tool holder toward and into engagement with each other irrespective of the relative angular positions of the spindle means and the tool holder about their axes whereby the tool holder can be readily attached to and detached from the spindle by an automatic tool changer used in conjunction with the machine tool.

Another object of the present invention is to provide a new and improved machine tool having a tool holder received in and driven by a rotatable spindle and in which the spindle and tool holder have meshing parts which provide a drive connection between the spindle and the tool holder and which parts can be moved into meshed engagement with one another by relative movement of the tool holder co-axially into the spindle regardless of the relative angular positions of the spindle and tool holder and even though the parts mesh only in certain relative angular positions of the tool holder and spindle.

Yet another object of the present invention is to provide a new and improved machine tool including a spindle which is rotated to drive a tool holder and which has a drive mechanism for drivingly interconnecting the spindle and the tool holder, and which drive mechanism includes a drive member supported by the spindle for rotational movement relative thereto while maintaining a driving connection therewith, the drive member and tool holder having cooperable tooth elements to effect a driving connection therebetween when the tool holder is attached to the spindle means, and which tooth elements are engageable with each other upon relative co-axial movement of the tool holder into the spindle so as to effect rotation of the drive member to a tooth clearing position, if the relative angular positions of the drive member and tool holder are such that the elements will not mesh with one another upon insertion of the tool holder into the spindle, thereby enabling the tool holder to be readily inserted into the spindle by an automatic tool changer.

Yet another object of the present invention is to provide a new and improved machine tool including a spindle means which is rotated to drive a tool holder and which carries a drive mechanism for drivingly interconnecting the spindle means and the tool holder, and which drive mechanism includes a drive member having a helical spline connection with the spindle means and supported thereon for rotational and axial movement relative thereto while maintaining the splined connection therewith, the drive member and tool holder having cooperable tooth elements to effect a driving connection therebetween when the tool holder is attached to the spindle means, and which tooth elements are engageable with each other upon relative co-axial movement of the tool holder into the spindle so as to effect rotational and axial movement of the drive member relative to the spindle means to a tooth clearing position, if the relative angular positions of the drive member and tool holder are such that the elements will not mesh with one another upon insertion of the tool holder into the spindle, thereby enabling the tool holder to be readily inserted into the spindle by an automatic tool changer.

Other objects, novel characteristics and advantages of this invention will be apparent in the following detailed description and in the accompanying drawings forming a part of this specification and in which:

FIG. 1 is a fragmentary part elevational and part sectional view of the machine tool embodying the present invention;

FIG. 2 is a schematic view of part of the machine tool shown in FIG. 1;

FIG. 7 is an enlarged fragmentary sectional view of part of the machine tool shown in FIG. 3 showing portions thereof in a different position.

Figure 3:
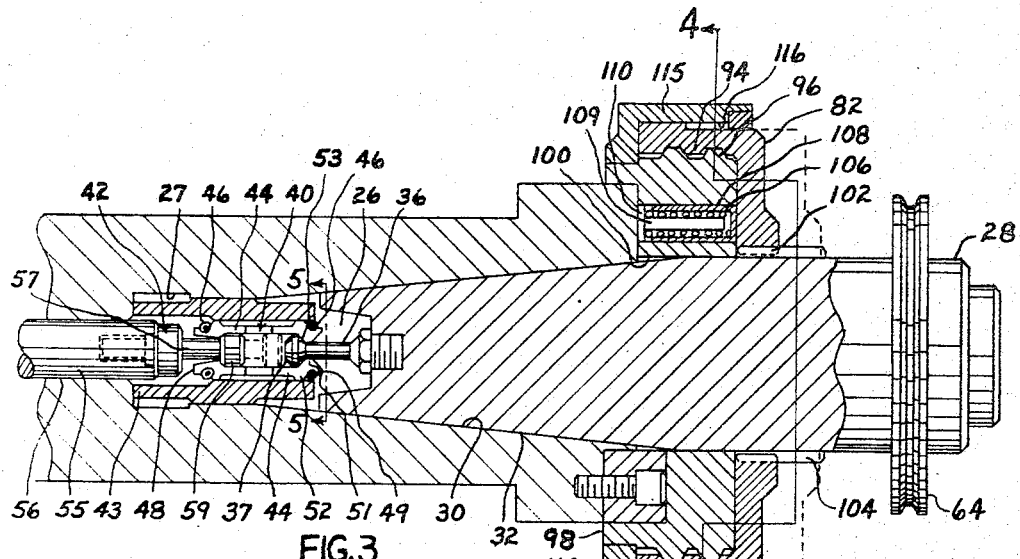
FIG. 3 is a fragmentary sectional view of part of the machine tool taken approximately along line 3—3 of FIG. 4.

Referring to the drawings, the present invention is there shown as embodied in a machine tool 10. The machine tool 10 may be of any suitable type, such as a conventional boring, milling and drilling machine having an automatic tool changer or mechanism for effecting tool changes. Since a detailed illustration and description of the overall boring, milling and drilling machine and tool changer is not necessary in order to obtain a clear understanding of the present invention, only those parts which are necessary to carry out the provisions of the present invention have been illustrated in the drawings and will be described herein.

The boring, drilling and milling machine embodying the present invention includes a spindle means 12 supported within a spindle head 14 for rotational and longitudinal movement relative thereto. The spindle means 12 comprises a spindle 15 which is slidably keyed within a coaxial spindle quill 16, which in turn is rotatably supported within the spindle head 14 by suitable bearings, not shown. The machine tool includes a suitable or conventional electric or hydraulic motor and change speed transmission (not shown) operatively connected to the spindle quill 16 for rotating the same and hence, the spindle 15 at variable speeds.

As schematically shown in FIG. 2, the inner end of spindle 15 is journaled in a bearing means 18, the bearing means 18 in turn being fixed to a nut 20 threadably engaged with a feed screw 22. The feed screw 22 is rotatably supported by suitable bearings 23, 24 at its ends within the spindle head 14 and is adapted to be rotated in either direction by a suitable or conventional drive means 25, such as an electric or hydraulic motor. It is apparent from the above, that when the drive means 25 is energized to rotate the feed screw 22, the nut 20 is caused to be moved axially therealong. Movement of the nut 20 along the feed screw 22 causes the spindle 15 to move axially relative to the quill 16 and the spindle head 14.

The spindle 15 at its outer end has a tapered socket in the form of an axially extending opening 26 which is adapted to receive a tool holder or arbor 28 carrying a tool for performing work on a workpiece. The socket 26 is here shown as having a cylindrical inner end portion 27 and a frusto-conically tapered outer end portion 30 which is adapted to be engaged by a complementary frusto-conical tapered shank portion 32 of the tool holder 28 when the latter is received in the socket 26. The tool holder 28 includes an axially extending adapter 36 having one end threadably connected with the inner end of the shank portion 32 and the opposite end provided with a plug or head 37.

Figure 5:
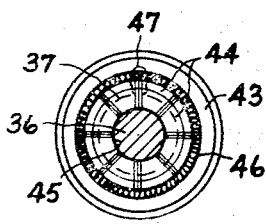
FIG. 5 is an enlarged fragmentary sectional view of part of the machine taken approximately along line 5—5 of FIG. 3.
Figure 6:
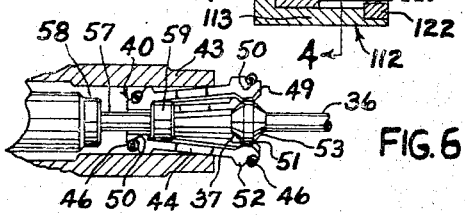
FIG. 6 is a fragmentary sectional view of part of the machine tool shown in FIG. 3 showing portions thereof in a different position.
Figure 4:
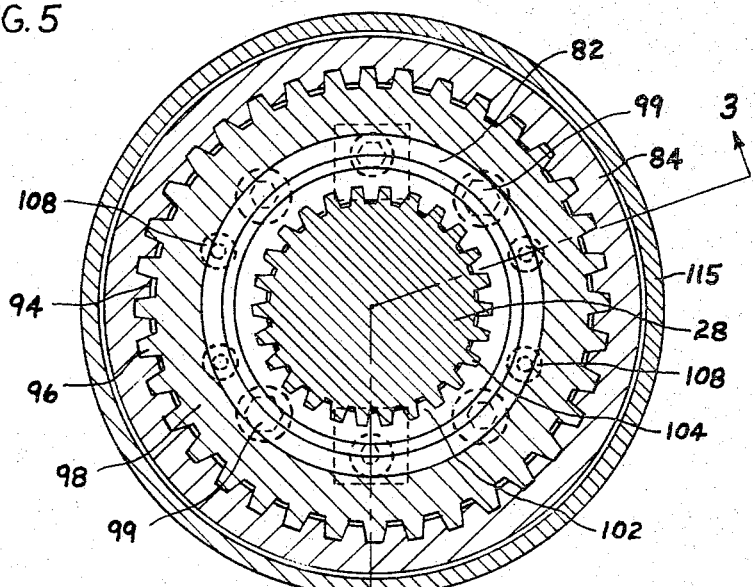
FIG. 4 is a sectional view of part of the machine tool taken approximately along line 4—4 of FIG. 3.

The plug 37 of the tool holder 28, when the latter is received within the socket 26, is adapted to be grasped by a holder means 40 of a releasable drawback mechanism 42 for the purpose of retaining the tool holder 28 within the socket 26 of the spindle 15. The holder means 40 is slidably supported within a sleeve 43 fixed within the cylindrical portion 27 of the socket 26 for axial movement relative thereto between an inner or holding position, as shown in FIG. 3, in which it grasps the plug 37 of the adapter 36 to hold the tool holder 28 within the socket 26 and an outer or release position, as shown in FIG. 5, in which it will release its grasp of the plug 37 in response to relative movement of the spindle 15 and the tool holder 28 away from one another.

The holder means 40 is radially contractable and expandable to enable it to grasp and release the plug 37 of the tool holder 28. To this end the holder means 40 comprises a plurality of fingers or elements 44 annularly arranged in a side by side relationship to define a central through opening 45 and a pair of annular coil or garter springs 46 for biasing the fingers toward a contracted position, as shown in FIGS. 3 and 5. The fingers 44 have opposite sides 47 which converge toward the axis of the opening 45 and which engage one another along their midportion when in their contracted position. The fingers 44 adjacent their inner and outer ends 48 and 49, respectively, are provided with outwardly facing grooves 50 which receive the garter springs 46 and radially inwardly and radially outwardly extending cam portions 51 and 52. The garter springs 46 extend circumferentially around the holder means 40 adjacent its inner and outer edges and function to bias the fingers 44 inwardly toward the axis of the opening 45 so that the adjacent sides 47 of the fingers 44 engage one another to define the radially contracted position shown in FIG. 5. When the holder means 40 is in its holding position, as shown in FIG. 3, both ends thereof are located within the sleeve 43, which sleeve functions to prevent the fingers 44 from being radially expanded, and the radially inwardly extending portions 51 of the fingers 44 grasp or holdingly engage the rearward side 53 of the plug 37. When the holder means 40 is in its outer or release position, the outer end thereof is located outside of the sleeve 43 so that the fingers 44 can be expanded radially outwardly in opposition to contracting bias imposed by the springs 46 upon relatively moving the spindle 15 away from the tool holder 28.

The drawback mechanism 42 also includes a draw-bolt or rod 55 operatively connected with the holder means 40 for retaining the latter in its holding position, as shown in FIG. 3. The draw-bolt 55 extends through an axial passage 56 in the spindle 15 and at its outer end has an axially extending adapter plug 57 threadably secured thereto. The adapter plug 57 has an inner head 58 located adjacent the outer end of the draw-bolt 55 and which is slidably received within the sleeve 43 and an outer head 59 spaced from the head 58 and which is slidably received within the holder means 40 between the inwardly extending cam portions 51 at the opposite ends thereof. The draw-bolt 55 is axially movable relative to the spindle 15 between an inner or holdback position, as shown in FIG. 3, wherein the head 59 thereof engages the inwardly extending portions 51 of the fingers 44 at the inner end of the holder means 40 to hold the latter in its holding position within the sleeve 43 and an outer or release position, as shown in FIG. 5, wherein the head 59 engages the plug 37 to permit the holder means 40 to be moved to its outer or release position wherein its outer end is located outwardly of the sleeve 43. When the draw-bolt 55 is moved to its outer position to allow the release of the holder means 40, it engages or bumps the plug 37 of the toolholder 28 to push the latter slightly outwardly to break it away from the socket 26 in the spindle 15. The draw-bolt 55 is adapted to be actuated between its inner and outer positions by any suitable or conventional means (not shown).

In the illustrated embodiment, the tool holder 28 is adapted to be inserted and removed from the socket 26 of the spindle 15 by relative movement of the spindle means 12 toward and from the tool holder 28, respectively, while the latter is being held in an axially aligned position therewith by a tool transfer means 60 of a tool changer. The tool changer may be of any suitable or conventional construction and since it does not per se form a part of the present invention, it will not be described in detail. Suffice it for present purposes to say that the tool transfer means 60 is provided with a tool grip 62 which is adapted to clampingly engage the opposite sides of an annular radially extending flange 64 rotatably journaled on the tool holder 28 and that the tool transfer means 60 is preferably supported by the spindle head 14 for rotational movement about an axis extending parallel to the spindle. Suffice it further to say the tool transfer means 60 is operatively connected with a suitable mechanism to rotate the same between a first position in which the tool grip 62 holds a tool holder 28 in axial alignment with the spindle 15 and a second position wherein the tool holder detached from the spindle can be removed from the tool grip 62 and another tool holder carrying a different tool placed therein for subsequent attachment to the spindle 15.

When it is desired to detach the tool holder 28 from the spindle 15 and replace it with another tool holder carrying a different tool, the tool transfer means 60 is rotated from its second position to its first position and the tool grip 62 actuated to clampingly engage the opposite sides of the flange 64 of the tool holder 28 to hold the latter stationary, and the draw-bolt 55 is moved to its outer or release position, as shown by the dotted lines in FIG. 3. As the spindle 15 is being retracted, the sleeve 43 is axially moved relative to the holder means 40, the latter remaining stationary by reason of the holding engagement between the outer end thereof and the plug 37 of the tool holder 28, until the outer end portion of the holder means 40 is located outside of the sleeve 43 and in its release position. Further retracting movement of the spindle 15 relative to the tool holder 28 causes the outer end of the holder means to expand by reason of the fingers 44 thereof at their outer ends 49 being cammed outwardly in opposition to the bias of the spring 46 by the engagement between the rearward side 53 of the plug 37 and the inwardly extending portion 51 and release its grasping engagement with the plug 37. When the plug 37 and holder means 40 separate, the spring 46 will cause the outer end of the holder means to be moved to its contracted position.

The transfer means 60 is then rotated to its second position and the tool holder removed from the tool grip 62 and another tool holder carrying a different tool placed in the tool grip 62. The transfer means 60 is then rotated to the first position in which the new tool holder is held in axial alignment with the spindle. The drive means 25 is then energized to cause the spindle 15 to be moved toward the tool holder until the tapered shank portion thereof engages the tapered complementary outer end 30 of the socket 26. As the tool holder 28 is being received within the socket 26, the plug 37 engages the outer ends 49 of the fingers 44 of the holder means 40, since the outer end will be in a contracted position. This engagement causes the fingers 44 of the holder means 40 to be moved rearwardly or toward the left, as viewed in FIG. 7, until the inner end of the holder means 40 engages the head 58 of the adapter plug 57 whereupon further movement of the tool holder 28 into the socket 26 causes the outer ends 49 of the fingers 44 to be expanded outwardly, by reason of the engagement between the cam portions 51 and the plug 37, until the plug 37 is in a position rearwardly of the inwardly extending portions 51. When the plug is in such a position, the bias imposed by the spring 46 causes the fingers 44 to be contracted and the inwardly extending portions 51 to engage the rearward side 53 of the plug 37 to grasp the same. The draw-bolt 55 is then actuated toward its holdback position. As the draw-bolt 55 is moved toward its holdback position, the head 59 thereof engages the radially inwardly portions 51 at the inner end of the holder means 40 and moves the holder means 40 axially relative to the sleeve 43 towards its holding position. If the holder means 40 should be slightly cocked as it is moved relative to the sleeve 43, the outwardly extending cam portions 52 at the outer end of the fingers 44 will engage the outer end of the sleeve 43 and align the holder means 40 with the sleeve 43. When the draw-bolt 55 has been moved to its holdback position, the holder means 40 is fully received within the sleeve 43 and retains the tool holder 28 within the socket 26.

According to the provisions of the present invention a novel drive mechanism or drive connection means 80 is provided for drivingly interconnecting the spindle means 12 and the tool holder 28 when the latter is attached to the spindle 15 and thereby provide for driving of the tool holder 28 by the spindle 15. The drive mechanism 80 functions to automatically effect a drive connection between the spindle means 12 and the tool holder 28 solely in response to relative axial movement of the spindle 15 and tool holder 28 towards each other irrespective of the relative angular positions of the spindle 15 and the tool holder 28 as the latter is being inserted in the socket 26 of the spindle 15.

The drive mechanism 80 comprises a drive member or sleeve 82 drivingly connected with the spindle means 12 and supported thereon for axial and rotational movement relative thereto while maintaining a driving connection therewith. The drive sleeve 82 is generally cupped-shaped and has an axially extending portion 84 and a radially inwardly extending end portion 86 at its outer or right end 87, as viewed in FIG. 1, provided with a central opening 88 for receiving the tool arbor. The drive sleeve 82 has an internal gear defined by a plurality of circumferentially spaced helically extending splines or tooth elements 94 along its inner periphery 90 at its inner or left end 92, as viewed in FIG. 1, which are adapted to cooperate and mesh with a plurality of circumferentially spaced helical splines or tooth elements 96 of an external gear 98 mounted on the outer end of the spindle 15. The gear 98 is mounted on the outer end of the spindle by a plurality of bolts 99 and has a central opening 100 through which the tool holder 28 projects when attached to the spindle 15. When the cooperable helical splines 94 and 96 of the sleeve 82 and the gear 98, respectively, are in meshed engagement with one another, they define a helical spline connection therebetween.

The radially inwardly extending portion 86 of the drive sleeve 82 along the wall of the opening 88 and the tool holder 28 along an outer peripheral portion 101 between its ends are provided with drive elements 102 and 104, respectively. The drive elements 102 and 104 are in the form of circumferentially spaced, axially extending splines or teeth which are adapted to cooperate and mesh with one another to define an axial spline connection therebetween when the tool arbor 28 is attached to the spindle 15.

The drive sleeve 82 is supported by the gear 98 for axial movement relative thereto between an inner position, as shown by the solid lines of FIG. 3 and an outer position, as shown in FIG. 1 and by the dotted lines in FIG. 3, while maintaining the helical splined connection therewith. The drive member is biased or urged toward its outer position by a plurality of compression springs 106, each of which is disposed within a tubular sleeve 108 closed at one end, which in turn is slidably received within an axially extending through opening 109 in the gear 98. Each of the springs 106 at one end is in abutting engagement with the head of a headed member or stud 110 whose shank is slidably received within the spring 106, the head of the headed member being in abutting engagement with the outer end face of the spindle 15, and the closed ends of the sleeves 108, which in turn are in abutting engagement with the radially inwardly extending portion 86 of the drive sleeve 82. It is apparent from the above that the force exerted by the compression springs 106 is transmitted through the sleeves 108 to the drive sleeve 82 to bias the same towards its outer position.

Movement of the drive sleeve 82 outwardly or toward the right as viewed in FIG. 3, when in its outer position is prevented by a retaining means 112 bolted or otherwise fixed to the gear 98. The retaining means 112 comprises an annular collar 113 having a radially inwardly extending portion 114 secured to the inner end of the gear 98 and an axially extending skirt portion 115 surrounding the remainder of the gear 98 and having an inner wall 116 spaced radially outwardly of the gear 98. The drive sleeve 82 has an annular radially outwardly extending flange 120 which is slidably engaged with the inner wall 116 of the skirt portion 115 and which is adapted to engage a suitable retaining ring 122 mounted to the skirt portion at its outer end when the sleeve 82 is in its outer position.

From the foregoing, it can be seen that if the relative angular positions of the cooperable tooth elements 102 and 104 of the drive sleeve 82 and tool holder 28, respectively, are such that the tooth elements 102 and 104 are in the tooth clearing relative positions when the tool holder 28 is being inserted into the socket of the spindle 15, the tooth elements 102 and 104 will slide relative to each other into meshed engagement to effect a driving connection therebetween. However, if the relative angular positions of the cooperating tooth elements 102 and 104 of the drive sleeve 82 and the tool holder 28 are such that their adjacent end portions 130 and 132, respectively, abut and engage one another as the tool holder 28 is being inserted into the socket 26 of the spindle 15, the drive sleeve is pushed and moved axially relative to the spindle 15 toward its inner position and at the same time rotated relative to the spindle 15, as a result of the helical spline connection between the drive sleeve 82 and the gear 98, until the cooperable tooth elements 102 on the drive sleeve 82 are in a tooth clearing position with respect to the tooth elements 104 on the tool holder 28. When the cooperable tooth elements 102 and 104 are in relative tooth clearing positions, continued relative movement of the spindle and tool holder 28 toward each other will cause these tooth elements to move relative to each other into meshed engagement and effect a driving connection therebetween. The springs 106 preferably provide a sufficient force to cause the drive sleeve 82 to be moved to its outer position, as shown by the dotted lines in FIG. 1, which movement is permitted since the tool holder 28 in the preferred embodiment, can rotate relative to the flange 64. Alternately, if desired, the flange 64 could be fixed to the tool holder 28 with the spindle 15 being allowed to freely rotate about its axis, in which case the drive sleeve 82 may be moved to its outer position by the action of the springs 106.

To facilitate effecting a drive connection between the drive sleeve 82 and the tool holder 28 the adjacent ends 130 and 132 of the cooperable tooth elements 102 and 104, respectively, can be provided with beveled or tapered sides, if desired.

From the foregoing, it is apparent that a novel machine tool having a drive mechanism which provides a positive drive connection between a tool holder and a rotatable spindle and which can be effected solely in response to relative coaxial movement of the spindle and tool holder toward each other irrespective of the initial relative angular positions of the spindle and tool holder has been provided. It will also be apparent to those skilled in the art that the novel machine tool has a drive mechanism which is especially applicable for use in machine tools where an automatic tool changer is to be employed. Moreover, since the novel machine tool has a drive mechanism which effects a drive connection irrespective of the relative angular positions of the spindle and tool holder, it will be apparent to those skilled in the art that relatively simplified forms of tool changers can be employed.

Although the machine tool of this invention has been illustrated and described herein to a somewhat detailed extent, it will be understood, of course, that the invention is not to be regarded as being limited correspondingly in scope, but includes all changes and modifications coming within the terms of the claims herein.

Having described my invention, I claim:

1. A machine tool comprising a rotatable spindle means having a socket for receiving a tool holder means carrying a tool; a drive member carried by one of said means and having a driving connection therewith, said drive member and the other of said means having cooperable drive elements to effect a positive driving connection therebetween when the tool holder is received in the socket and thereby provide for driving of said tool holder means by said spindle means; means supporting said drive member for rotational movement relative to said one means while maintaining a driving connection therebetween, means for effecting rotation of said drive member relative to said one means in response to relative axial movement of said one and said other means toward each other on non-cooperable engagement of said drive elements on said other means and said drive member to position the cooperable drive elements on said drive member relative to the cooperable drive elements on said other means such that they cooperably engage one another and effect a positive driving connection therebetween, and means for holding said tool holder in the socket of said spindle means when the tool holder is received therein.

2. A machine tool comprising a rotatable spindle means having a socket for receiving a tool holder means carrying a tool; a drive member carried by one of said means and having a driving connection therewith, said drive member and the other of said means having cooperable drive elements to effect a positive driving connection therebetween when the tool holder is received in the socket and thereby provide for driving of said tool holder means by said spindle means; means supporting said drive member for rotational and axial movement relative to said one means while maintaining a driving connection therebetween, means for effecting rotational and axial movement of said drive member relative to said one means in response to relative axial movement of said one and said other means toward each other on non-cooperable engagement of said drive elements on said other means and said drive member to position the cooperable drive elements on said drive member relative to the cooperable drive elements on said other means such that they cooperably engage one another and effect a driving connection therebetween, and means for holding said tool holder in the socket of said spindle means when the tool holder is received therein.

3. A machine tool comprising a rotatable spindle means having a socket for receiving a tool holder means carrying a tool; a drive member carried by one of said means and having a driving connection therewith; said drive member and the other of said means having cooperable tooth elements defining an axial spline connection to effect a driving connection therebetween when said tool holder means is received in the socket and thereby provide for driving of said tool holder means by said spindle means; means supporting said drive member for rotational movement relative to said one means while maintaining the driving connection therebetween, means for rotating said drive member relative to said one means in response to an axial force applied by said other means to said drive member on non-meshing engagement of said other means and said drive member when said one and said other means are relatively axially moved toward each other to a tooth clearing position to enable said cooperating tooth elements to be moved into meshed engagement and effect a driving connection therebetween, and means for holding said tool holder in the socket of said spindle means when the tool holder is received therein.

4. A machine tool comprising a rotatable spindle means having a socket for receiving a tool holder means carrying a tool; a drive member carried by one of said means and having a driving connection therewith, said drive member and the other of said means having cooperable tooth elements defining an axial spline connection to effect a driving connection therebetween when said tool holder means is received in said socket and thereby provide for driving of said tool holder means by said spindle means; means supporting said drive member for rotational and axial movement relative to said one means while maintaining the driving connection therebetween, means for relatively moving said one and said other means axially toward each other, means for effecting rotational and axial movement of said drive member relative to said one means in response to an axial force applied by said other means to said drive member on non-meshing engagement of said other means and said drive member when said one and said other means are relatively axially moved toward each other to a tooth clearing position to enable said cooperating tooth elements to be moved into meshed engagement and effect a driving connection therebetween, and retaining means carried by said spindle means for holding said tool holder means in the socket of the spindle means.

5. A machine tool comprising a rotatable spindle means having a socket for receiving a tool holder means carrying a tool; a drive member carried by one of said means, said drive member and said one means having cooperating tooth elements defining a helical spline connection to effect a driving connection therebetween, said drive member and other of said means having cooperating tooth elements defining an axial spline connection to effect a driving connection therebetween when the tool holder means is received in the socket and thereby provide for driving of said tool holder means by said spindle means; said helical spline connection between said drive member and said one means supporting said drive member for rotational and axial movement relative to said one means while maintaining the driving connection therebetween, means for relatively moving said one and said other means axially toward each other, means for effecting rotational and axial movement of said drive member relative to said one means along said helical spline connection therebetween in response to an axial force applied by said other means to said drive member on non-meshing engagement of said other means and said drive member when said one and said other means are relatively axially moved toward each other to a tooth clearing position to enable said cooperating tooth elements on said drive member and said other means to be moved into meshed engagement and effect a driving connection therebetween, and retaining means carried by said spindle means for holding said tool holder means in the socket of said spindle means.

6. A machine tool comprising a rotatable spindle means having a socket which is adapted to receive a tool holder carrying a tool; a drive member carried by said spindle means and having a driving connection therewith, said drive member and said tool holder having cooperable drive elements to effect a driving connection therebetween when said tool holder is received in said socket and thereby provide for driving of said tool holder by said spindle means; means supporting said drive member for rotational movement relative to said spindle means while maintaining the driving connection therebetween, means for relatively moving said spindle means and said tool holder axially toward each other, means for rotating said drive member relative to said spindle in response to an axial force applied by said tool holder to said drive member on non-cooperable engagement of said drive elements on said drive member and said tool holder when said spindle means and said tool holder are relatively axially moved toward each other to position the cooperable drive elements of said drive member relative to the cooperable drive elements on said tool holder such that a driving connection can be effected therebetween, and means carried by said spindle for retaining said tool holder in the socket of said spindle when the former is received therein.

7. A machine tool comprising a rotatable spindle means having a socket which is adapted to receive a tool holder carrying a tool; a drive member carried by said spindle means and having a driving connection therewith, said drive member and said tool holder having cooperable drive elements to effect a driving connection therebetween when said tool holder is received in the socket and thereby provide for driving of said tool holder by said spindle means; means supporting said drive member for rotational and axial movement relative to said spindle means while maintaining the driving connection therebetween, means for positioning a tool holder to be attached to the spindle means in axial alignment with the spindle means and for relatively moving said spindle means and said tool holder axially toward each other, means for rotating and axially moving said drive member relative to said spindle in response to an axial force applied by said tool holder to said drive member on non-cooperable engagement of said drive elements on said drive member and said tool holder when said spindle means and said tool holder are relatively axially moved toward each other to position the cooperable drive elements of said drive member relative to the cooperable drive elements on said tool holder such that a driving connection can be effected therebetween, and means carried by said spindle for retaining said tool holder in the socket of said spindle when the former is received therein.

8. A machine tool as defined in claim 7 wherein said drive member is axially movable between an outer position and an inner position and means for biasing said drive member toward its outer position.

9. A machine tool comprising a rotatable spindle means having a socket which is adapted to receive a tool holder carrying a tool; a drive member carried by said spindle means and having a driving connection therewith, said drive member and said tool holder having cooperating tooth elements defining an axial extending spline connection to effect a driving connection therebetween when the tool holder is received in the socket and thereby provide for driving of said tool holder by said spindle; means supporting said drive member for rotational and axial movement relative to said spindle means while maintaining the driving connection therebetween, means for positioning a tool holder to be attached to the spindle means in axial alignment with the spindle means, means for relatively moving said spindle means and said tool holder axially toward each other, means for effecting rotational and axial movement of said drive member in response to an axial force applied by said tool holder to said drive member on non-meshing engagement of the tooth elements on said drive member and tool holder when said spindle means and tool holder are relatively axially moved toward each other to a tooth clearing position to enable said cooperating tooth elements to be moved into meshed engagement and effect a driving connection therebetween, and means carried by said spindle means for holding said tool holder in the socket of said spindle when the former is received therein.

10. A machine tool comprising a rotatable spindle means having a socket which is adapted to receive a tool holder carrying a tool; a drive member carried by said spindle means and having a driving connection therewith; said drive member and said tool holder having cooperating tooth elements defining an axial extending spline connection to effect a driving connection therebetween when the tool holder is received in the socket and thereby provide for driving of said tool holder by said spindle means; means supporting said drive member for rotational movement relative to said spindle means while maintaining the driving connection therebetween, means for relatively moving said spindle means and said tool holder axially toward each other, said cooperable tooth elements on said drive member and said tool holder having end portions which engage and abut one another, if not in relative tooth clearing positions as said spindle means and tool holder are relatively axially moved toward each other, and effect rotation of said drive member relative to said spindle means to a tooth clearing position to enable said cooperating tooth elements to be moved into meshed engagement and effect a driving connection therebetween, and means carried by said spindle means for retaining said tool holder in the socket of said spindle means when the latter is received therein.

11. A machine tool comprising a rotatable spindle means having a socket which is adapted to receive a tool holder carrying a tool; a drive member carried by said spindle means and having a driving connection therewith, said drive member and said tool holder having cooperating tooth elements defining an axial extending spline connection to effect a driving connection therebetween when the tool holder is received in the socket and thereby provide for driving of said tool holder by said spindle; means supporting said drive member for rotational and axial movement relative to said spindle means while maintaining the driving connection therebetween, means for relatively moving said spindle means and said tool holder toward each other, said cooperable tooth elements on said drive member and said tool holder having end portions which engage and abut one another, if not in relative tooth clearing positions when said tool holder and said spindle means are relatively axially moved toward each other, and effect rotational and axial movement of said drive member relative to said spindle means to a tooth clearing position and enable said cooperating tooth elements to be moved into meshed engagement and effect a driving connection therebetween, and means carried by said spindle means for holding said tool holder in the socket of the spindle means when the tool holder is received therein.

12. A machine tool comprising a rotatable spindle means having a socket which is adapted to receive a tool holder carrying a tool; a drive member carried by said spindle means, said drive member and said spindle means having cooperating helically extending tooth elements defining a helically splined driving connection therebetween, said drive member and said tool holder having cooperating axially extending tooth elements defining an axially splined driving connection therebetween when the tool holder is received in the socket and thereby providing for driving of said tool holder by said spindle means; said helical spline connection between said spindle means and said drive member supporting said drive member for rotational and axial movement relative to said spindle means while maintaining the driving connection therebetween, means for positioning a tool holder to be attached to the spindle means in axial alignment with the spindle means, means for relatively moving said spindle means and said tool holder axially toward each other, means for effecting rotational and axial movement of said drive member in response to an axial force applied by said tool holder to said drive member on non-meshing engagement of the tooth elements on said drive member and tool holder when said spindle means and tool holder are relatively axially moved toward each other to a tooth clearing position and enable said cooperating tooth elements thereon to be moved into meshed engagement and effect a driving connection therebetween, and means carried by said spindle means for holding said tool holder in the socket of said spindle when the former is received therein.

13. A machine tool comprising a rotatable spindle means having a socket which is adapted to receive a tool holder carrying a tool; a drive member carried by said spindle means, said drive member and said spindle means having cooperating helically extending tooth elements defining a helically splined driving connection therebetween, said drive member and said tool holder having cooperating axially extending tooth elements defining an axially splined driving connection therebetween when the tool holder is received in the socket and thereby provide for driving of said tool holder by said spindle means; said helical spline connection between said spindle means and said drive member supporting said drive member for rotational and axial movement relative to said spindle means while maintaining the driving connection therebetween, means for relatively moving said spindle means and said tool holder axially toward each other, said cooperable tooth elements on said tool holder and said drive member having end portions which engage and abut one another, if the cooperating tooth elements thereon are not in relative tooth clearing positions when said tool holder and spindle means are relatively axially moved toward each other, to effect rotational and axial movement of said drive member along said helical spline connection relative to said spindle to a tooth clearing position and enable said cooperating tooth elements on said drive member and said tool holder to be moved into meshed engagement and effect a driving connection therebetween, and means carried by said spindle means for holding said tooth holder in the socket when the tooth holder is received therein.

14. A machine tool, as defined in claim 13, wherein said drive member is axially movable between an outer and an inner position and means for biasing said drive member toward its outer position.

15. A machine tool, as defined in claim 14, wherein said means for biasing said drive member toward its outer position comprises a plurality of compression springs carried by said spindle means and having their ends in abutting engagement with said spindle means and said drive member.

16. A machine tool as defined in claim 8 wherein said tool holder carries a radially extending flange which is clampingly engaged by said means for positioning said tool holder in axial alignment with said spindle means, said tool holder rotating relative to said flange when said biasing means moves said drive member toward its outer position after a drive connection is effected between the tool holder and drive member.

No references cited.

WILLIAM W. DYER, JR., *Primary Examiner.*

G. A. DOST, *Assistant Examiner.*